United States Patent
Hashizume et al.

(10) Patent No.: US 8,596,112 B2
(45) Date of Patent: Dec. 3, 2013

(54) PISTON STROKE DISCRIMINATING APPARATUS FOR GENERAL-PURPOSE ENGINE

(75) Inventors: Takashi Hashizume, Wako (JP); Shigeru Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 13/218,838

(22) Filed: Aug. 26, 2011

(65) Prior Publication Data

US 2012/0055240 A1  Mar. 8, 2012

(30) Foreign Application Priority Data

Sep. 8, 2010 (JP) ................ 2010-201468

(51) Int. Cl.
*G01M 15/06* (2006.01)

(52) U.S. Cl.
USPC ........................................ 73/114.27

(58) Field of Classification Search
USPC ............. 73/114.26, 114.27, 114.28, 114.29
See application file for complete search history.

(56) References Cited

U.S. PATENT DOCUMENTS

| 6,170,322 | B1 * | 1/2001 | Yamazaki et al. | 73/114.27 |
| 6,935,168 | B2 * | 8/2005 | Shimoyama | 73/114.28 |
| 7,669,584 | B2 * | 3/2010 | Matekunas et al. | 123/435 |
| 2002/0170346 | A1 * | 11/2002 | Shimoyama | 73/118.2 |
| 2004/0261767 | A1 | 12/2004 | Sawada et al. | |
| 2007/0012096 | A1 * | 1/2007 | Galtier et al. | 73/117.3 |
| 2007/0233356 | A1 * | 10/2007 | Weiss et al. | 701/105 |

FOREIGN PATENT DOCUMENTS

| JP | 3839119 B2 | 11/2006 |
| JP | 2008-309033 A | 12/2008 |
| WO | WO 03/036069 A1 | 5/2003 |

OTHER PUBLICATIONS

Japanese Office Action issued in JP 2010-201468, dated Jun. 26, 2013, 3 pages.

* cited by examiner

*Primary Examiner* — Eric S McCall

(74) *Attorney, Agent, or Firm* — Arent Fox LLP

(57) ABSTRACT

In an apparatus for discriminating a piston stroke of a general-purpose internal combustion engine connectable to an operating machine to be used as a prime mover of the machine and having a four-stroke operating cycle comprising intake, compression, expansion and exhaust, the operating cycle is discriminated based on intake air temperature detected by an intake air temperature sensor whether a stroke next to a predetermined crank angular position at which a crank angle sensor produces an output is the intake stroke or the expansion stroke, when operation of the engine is determined to be under a stable condition. With this, it becomes possible to discriminate the four-stroke operating cycle of the general-purpose engine without using an expensive pressure sensor.

7 Claims, 3 Drawing Sheets

PISTON STROKE DISCRIMINATING APPARATUS FOR GENERAL-PURPOSE ENGINE

BACKGROUND

1. Technical Field

The embodiments relate to a piston stroke discriminating apparatus for a general-purpose internal combustion engine, particularly to an apparatus for discriminating the four-stroke operating cycle comprising intake, compression, expansion and exhaust of the general-purpose internal combustion engine.

2. Background Art

A piston stroke discriminating apparatus of an internal combustion engine is taught, for example, in Japanese Patent No. 3839119, that discriminates a piston stroke from a detected pressure in air intake pipe connected to cylinders. It discriminates the piston stroke based on the fact that the air intake pipe pressure is different in the intake and expansion in the four-stroke operating cycle.

SUMMARY

The technique in the reference requires a pressure sensor for detecting the air intake pipe pressure. However, the pressure sensor of this kind is relative expensive. Since the general-purpose engine should preferably be simple in structure, it is not desirable to have such an expensive sensor.

An object of the embodiments is therefore to overcome the foregoing problem by providing a piston stroke discriminating apparatus for a general-purpose engine that can discriminate the four-stroke operating cycle of the general-purpose engine without using an expensive pressure sensor.

In order to achieve the object, the embodiment provides in its first aspect an apparatus for discriminating a piston stroke of a general-purpose internal combustion engine connectable to an operating machine to be used as a prime mover of the machine, the engine having a four-stroke operating cycle comprising intake, compression, expansion and exhaust and including a piston moveably accommodated in a cylinder to be connected to a crankshaft, comprising: a crank angle sensor that produces an output in response to rotation of the crankshaft at a predetermined crank angular position in synchronism with movement of the piston in the cylinder; an intake air temperature sensor that produces an output indicative of a temperature of intake air sucked in to the engine; an engine operation condition determiner that determines whether operation of the engine is under a stable condition; and a stroke discriminator that discriminates based on the intake air temperature detected by the intake air temperature sensor whether a stroke next to the predetermined crank angular position at which the crank angle sensor produces the output is the intake stroke or the expansion stroke, when the operation of the engine is determined to be under the stable condition.

In order to achieve the object, the embodiment provides in its second aspect a method for discriminating a piston stroke of a general-purpose internal combustion engine connectable to an operating machine to be used as a prime mover of the machine, the engine having a four-stroke operating cycle comprising intake, compression, expansion and exhaust and including a piston moveably accommodated in a cylinder to be connected to a crankshaft, comprising the steps of: producing an output in response to rotation of the crankshaft at a predetermined crank angular position in synchronism with movement of the piston in the cylinder; producing an output indicative of a temperature of intake air sucked in to the engine; determining whether operation of the engine is under a stable condition; and discriminating based on the detected intake air temperature whether a stroke next to the predetermined crank angular position at which the output is produced is the intake stroke or the expansion stroke, when the operation of the engine is determined to be under the stable condition.

BRIEF DESCRIPTION OF DRAWINGS

The above and other objects and advantages will be more apparent from the following description and drawings in which.

DESCRIPTION OF EMBODIMENT

A piston stroke discriminating apparatus for a general-purpose engine according to an embodiment will now be explained with reference to the attached drawings.

Figure 1:
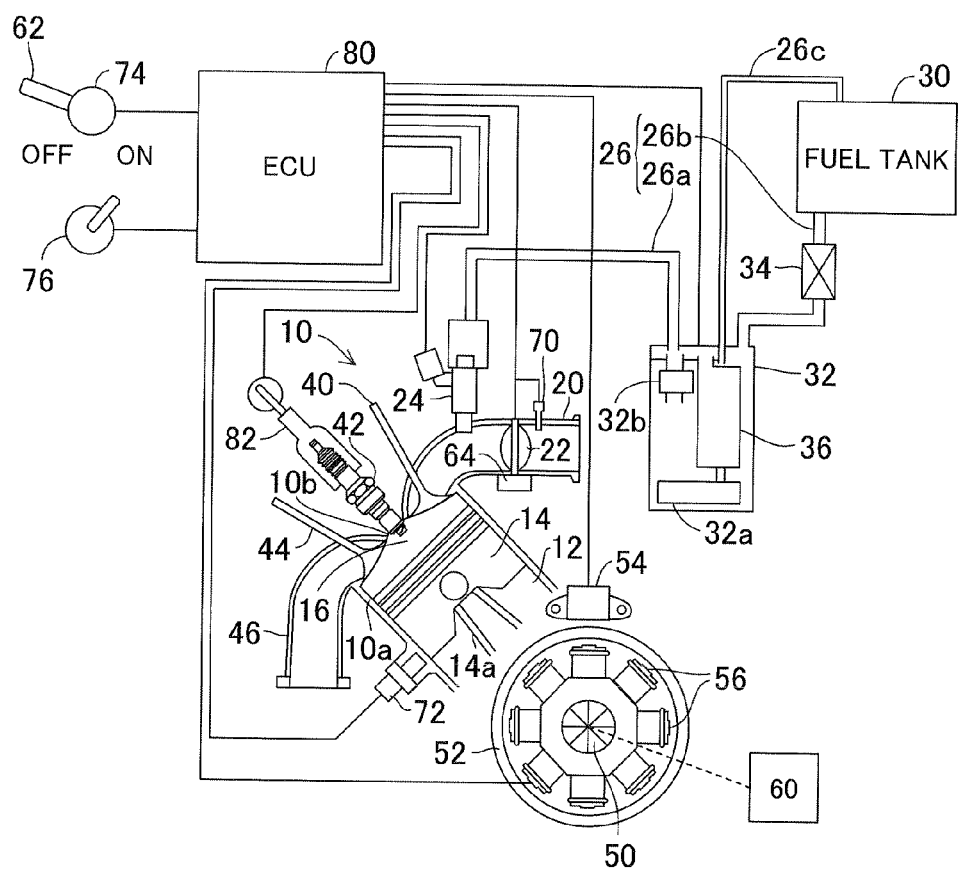
FIG. 1 is an overall view schematically showing a piston stroke discriminating apparatus for a general-purpose engine according to an embodiment.

In FIG. 1, reference numeral 10 designates a general-purpose engine (general-purpose internal combustion engine). The engine 10 is a gasoline-injection, single-cylinder, air-cooled, OHV engine with a displacement of, for example, 200 cc.

The engine 10 has the four-stroke operating cycle comprising intake, compression, expansion and exhaust and comprises a general-purpose internal combustion engine usable as a prime mover of (connectable to) an industrial small operating machine for agricultural, constructional and other use.

A cylinder 12 formed in a cylinder block 10a of the engine 10 accommodates a piston 14 that reciprocates therein. A cylinder head 10b is attached to the cylinder block 10a and a combustion chamber 16 is formed between the cylinder head 10b and the crown of the piston 14.

The combustion chamber 16 is connected to an air intake pipe 20. The air intake pipe 20 is installed with a throttle valve 22 and at the downstream thereof, further installed with an injector 24 near an intake port. The injector 24 is connected to a fuel tank 30 through a fuel supply pipe 26.

To be more specific, the injector 24 is connected to a sub fuel tank 32 through a first fuel supply pipe 26a and the sub fuel tank 32 is connected to the fuel tank 30 through a second fuel supply pipe 26b.

The second fuel supply pipe 26b is interposed with a low-pressure pump 34 to pump fuel (gasoline) stored in the fuel tank 30 to be forwarded to the sub fuel tank 32. The sub fuel tank 32 is installed with a fuel pump (high-pressure pump) 36.

The fuel pump 36 pressurizes the fuel forwarded and filtered through a filter 32a and pumps to the injector 24 through the fuel supply pipe 26a, while regulating by a regulator 32b. A part of the fuel in the sub fuel tank 32 is returned to the fuel tank 30 through a return pipe 26c.

The intake air sucked through an air cleaner (not shown) is flown through the air intake pipe 20. After the flow rate is regulated by the throttle valve 22, the intake air reaches the intake port and is mixed with the fuel injected from the injector 24 to form the air-fuel mixture.

When an intake valve 40 is opened, the air-fuel mixture is flown into the combustion chamber 16 and ignited by a spark plug 42 to burn, thereby driving the piston 14. When an exhaust valve 44 is opened, the exhaust gas produced through the combustion is flown through an exhaust pipe 46, muffler (not shown), etc., and discharged to the exterior.

A crankcase (not shown) is attached to the cylinder block 10a on the side opposite from the cylinder head 10b and houses a crankshaft 50 to be rotatable therein. The crankshaft 50 is connected to the piston 14 through a connecting rod 14a and rotated with the movement of the piston 14.

A camshaft (not shown) is rotatably housed in the crankcase to be parallel with the crankshaft 50 and connected via a gear mechanism (not shown) to the crankshaft 50 to be driven thereby. The camshaft is equipped with an intake cam and exhaust cam to open/close the intake valve 40 and exhaust valve 44 through a push rod and rocker arms (neither shown).

One end of the crankshaft 50 is attached with a flywheel 52. A pulsar coil (crank angle sensor) 54 is attached to the crankcase outside the flywheel 52.

The pulsar coil 54 is rotated relative to a magnet (permanent magnet piece; not shown) attached on a top surface of the flywheel 52 and crosses the flux of the magnet, so that it produces one output (crank pulse) in response to the rotation of the crankshaft 50, more specifically it produces one output per one rotation (360 degrees) of the crankshaft 50 at a predetermined crank angular position near the top dead center in synchronism with the movement of the piston 14 in the cylinder 12.

Figure 2:
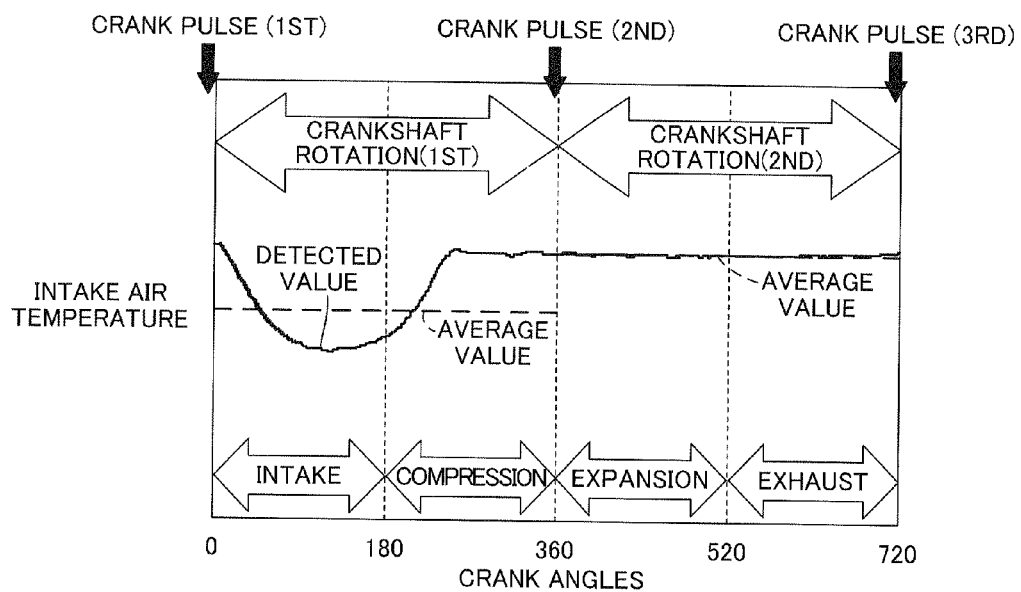
FIG. 2 is an explanatory view showing the output of a pulsar coil (crank angle sensor) of the apparatus shown in FIG. 1 relative to the crank angles.

FIG. 2 is an explanatory view showing the output (crank pulse) of the pulsar coil 54 relative to the crank angles.

As illustrated, since the engine 10 is a four-stroke operating cycle engine, the pulsar coil 54 produces two crank pulse per 720 crank angles. Specifically, the pulsar coil 54 produces a crank pulse (output) at a predetermine crank angular position near the end of the exhaust stroke and at a predetermine crank angular position near the end of the compression stroke among the four-stroke operating cycle comprising intake, compression, expansion and exhaust.

In other words, the stroke next to the stroke (during which the pulsar coil 54 produces the crank pulse) will be the intake stroke or the expansion stroke. Three crank pulses illustrated in the figure is named the first, second and third outputs. The crankshaft rotation (movement of the piston 14) between the first and second crank pulses is referred to a "crankshaft rotation (1st)" and that between the second and third crank pulses is referred to a "crankshaft rotation (2nd)".

Returning to the explanation of FIG. 1, power coils (generator coils) 56 are attached in the inside of the crankcase and are rotated relative to eight magnets (permanent magnet piece; not shown) attached on a back surface of the flywheel 52 to produce electromotive forces by crossing the flux of the magnets. Thus the power coils 56 function as an Alternating-Current Generator (ACG). The produced electromotive force is rectified and then supplied to the battery 38 to charge it.

The other end of the crankshaft 50 is connected to a load 60 such as an operating machine. In the embodiments, a term of "load" means a machine or equipment that consumes power or energy (output) generated by a prime mover, or an amount or volume of power consumed by the machine.

An accelerator lever 62 to be manipulated by the operator (user) is installed at an appropriate position on a housing (not shown) of the engine 10. The lever 62 comprises a knob to be pinched by the operator's fingers, so that the operator can input a command for establishing a desired engine speed by turning the knob within a range between predefined minimum and maximum engine speeds.

The throttle valve 22 is connected to an electric motor (actuator, more exactly, a stepper motor) 64. The motor 64 opens/closes or regulates the throttle valve 22 independently from the manipulation of the accelerator lever 62 by the operator. Specifically, the throttle valve 22 is of a Drive-By-Wire type.

An intake air temperature sensor 70 comprising a thermistor or the like is installed in the air intake pipe 20 at the upstream of the throttle valve 22 and produces an output or signal indicative of a temperature of intake air flowing therethrough and sucked in to the engine 10. An engine temperature sensor 72 comprising a thermistor or the like is installed at the cylinder block 10a and produces an output or signal indicative of a temperature of the installed position, i.e., a temperature of the engine 10.

A variable resistor (potentiometer) 74 is connected to the accelerator lever 62 to produce an output or signal representing the desired engine speed desired by the operator. A manipulation switch (main switch) 76 to be manipulated by the operator is installed at an appropriate position on the housing of the engine 10.

The manipulation switch 76 produces an output or signal indicating an operation command such as an engine start command when being manipulated to an ON position (made ON) by the operator and a stop command when being manipulated to an OFF position (made OFF).

The outputs of the foregoing sensors 70, 72, 74, switch 76, pulsar coil 54 and power coils 56 are sent to an Electronic Control Unit (ECU) 80. The ECU 80 comprising a microcomputer having a CPU, ROM, RAM and input/output circuits.

The ECU 80 detects the engine speed based on the output of the pulsar coil 54 and controls the opening operation of the injector 24, the driving operation of the fuel pump 36, etc., the driving operation of the motor 64, and other operation based on the outputs of the other sensors. The engine speed may be detected based on the outputs of the power coils 56.

As for the operation of the motor 64, the ECU 80 instructs or determines it in accordance with the manipulation of the accelerator lever 62 by the operator, i.e., calculates an opening of the throttle valve 22 (throttle opening) that can establish the desired engine speed set by the operator and sends a command for achieving the calculated throttle opening to the motor 64 through a drive circuit (not shown).

Hence, the engine 10 according to the embodiments comprises an electronic governor having the motor 64, ECU 80, etc. In other words, the engine 10 includes the actuator (motor) 64 that moves the throttle valve 22 installed in the air intake pipe 20 to establish the desired engine speed set by the operator.

Since the ECU 80 instructs a rotational amount of the motor 64, it can calculate or detect the throttle opening based on a command value produced by itself, without a throttle opening sensor.

In relation to valve opening operation of the injector 24, the fuel injection control is explained. The ECU 80 calculates a fuel injection amount by retrieving mapped values (characteristics) set beforehand using at least the calculated throttle opening and the engine speed detected from the output of the pulsar coil 54, i.e., by using a method called a throttle speed method.

The fuel injection amount is calculated from the injection time (opening time) of the injector 24. When the engine 10 is started, the retrieved value from the mapped values is corrected with the detected engine temperature and when the intake air temperature is greatly varied, the retrieved value is corrected with the detected intake air temperature.

With reference to the ignition control, the ECU 80 calculates the ignition timing based on appropriate parameters and controls the ignition operation of the spark plug 42 through an ignition device 82 such as an ignition coil. The fuel injection and ignition operation are carried out in response to the output of the pulsar coil 54.

Further, as mentioned above, the ECU 80 determines the desired engine speed in accordance with the manipulation of the accelerator lever 62, calculates the throttle opening to achieve the determined desired engine speed, and calculates the fuel injection amount based on at least the calculated throttle opening and detected engine speed.

The ECU 80 carries out the above determination of the desired engine speed, calculation of the throttle opening, detection of the engine speed, calculation of the fuel injection amount, calculation of an amount of current supply to the motor 36a of the pump 36, etc., at predetermined intervals, e.g., 10 milliseconds, and holds or stores the results thereof during predetermined multiple control cycles.

The ECU 80 executes the above operation when the manipulation switch 76 is made ON by the operator and stops or finishes the operation when it is made OFF.

Further, the ECU 80 discriminates the piston stroke of the engine 10.

Figure 3:
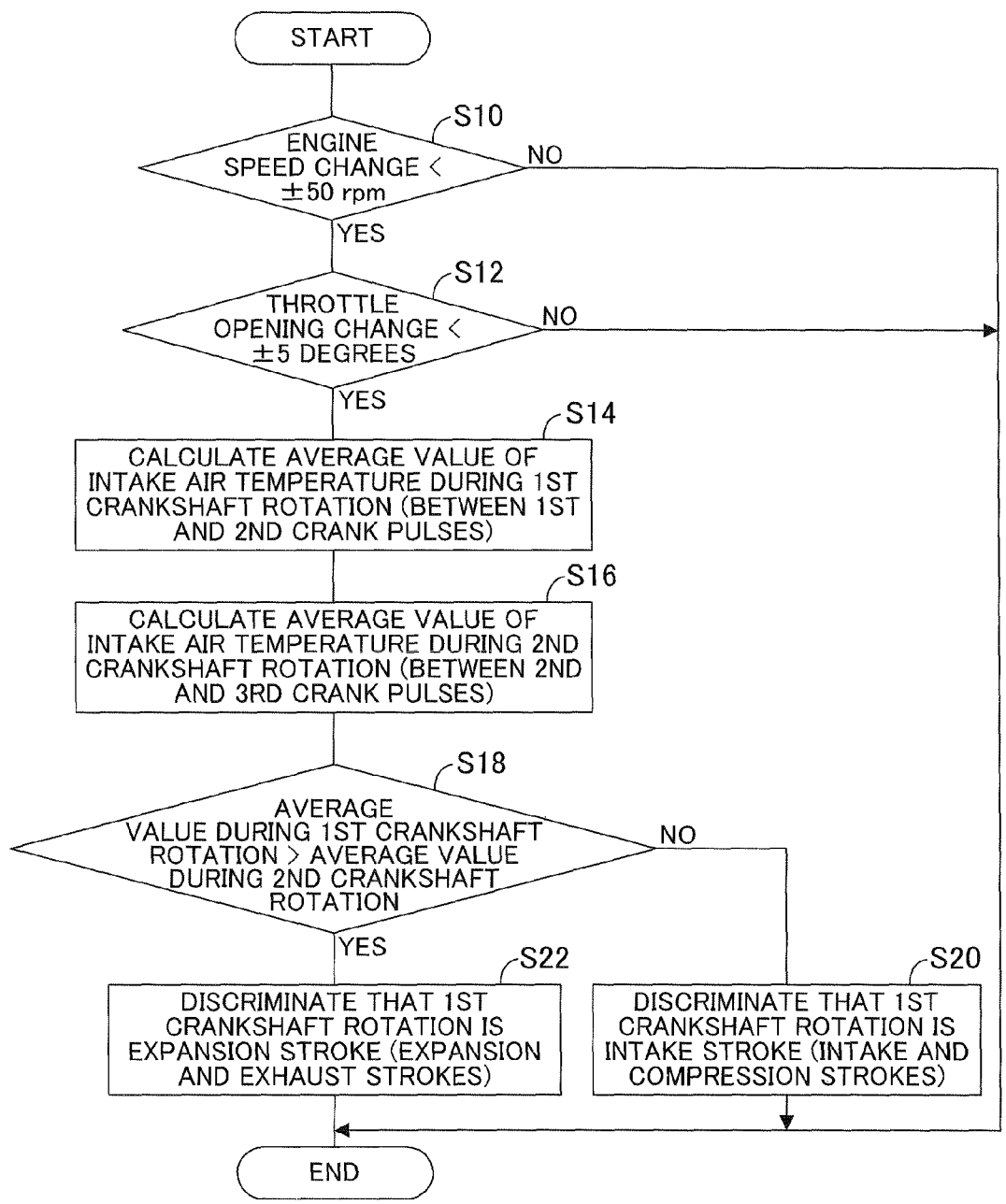
FIG. 3 is a flowchart showing piston stroke discriminating f conducted by the apparatus shown in FIG. 1.

FIG. 3 is a flowchart showing the piston stroke discriminating of the engine 10. The program of the flowchart is executed once at predetermined time intervals.

The program begins at S(step)10, in which it is determined whether engine speed change is within a range of plus/minus 50 rpm. Specifically, it is determined whether a difference between the engine speed detected at the latest, e.g., current control cycle (the time at which the FIG. 3 flowchart program is executed) and that detected at the control cycle preceding thereto, is within plus/minus 50 rpm.

When the result in S10 is negative, the program is immediately terminated, but if the result is affirmative, the program proceeds to S12, in which it is determined whether throttle opening change is within a range of plus/minus 5 degrees. Specifically, it is determined whether a difference between the throttle opening detected at the latest, e.g., current control cycle (the time at which the FIG. 3 flowchart program is executed) and that detected at the control cycle preceding thereto, is within plus/minus 5 degrees.

When the result in S12 is negative, the program is immediately terminated.

The processing in S10 and S12 is to determine whether operation of the engine 10 is under a stable condition. Specifically, when the engine speed or throttle opening changes during the piston stroke discrimination, it may act to the air intake pipe pressure (pressure in the air intake pipe 20) as a disturbance and influence on the piston stroke discrimination.

For that reason, the values used in S10 and S12 suffice if they can make it possible to determine whether the engine operation is under the stable condition and hence, they are not limited to those illustrated in S10 and S12.

On the other hand, when the result in S12 is also affirmative, in other words, when it is determined that the engine operation is under the stable condition, the program proceeds to S14, in which the intake air temperature detected by the intake air temperature sensor 70 during the first crankshaft rotation between the first and second crank pulses is calculated. More precisely, an average value of the intake air temperature is calculated.

Then the program proceeds to S16, in which the intake air temperature during the second crankshaft rotation between the second and third crank pulses, more precisely, an average value of the intake air temperature during the second crankshaft rotation is calculated.

More specifically, in S14 and S16, the output of the intake air temperature sensor 70 is read successively once every short time intervals, e.g., once every 1 millisecond, and simple average value of the sensor outputs during the first crankshaft rotation (between the first and second crank pulses) and that during the second crankshaft rotation (between the second and third crank pulses) are calculated.

For example, if the engine speed at that time is 3600 rpm, a time period between the first or second crankshaft rotation is 16 milliseconds. As a result, 16 sensor outputs or so will be read and a simple average value of the outputs (or some of the outputs) is calculated during each crankshaft rotation.

The program then proceeds to S18, in which the average value of the intake air temperature during the first crankshaft rotation is compared with that during the second crankshaft rotation, and it is determined whether the average value during the first crankshaft rotation is larger than that during the second crankshaft rotation.

When the result in S18 is negative and it is determined that the average value during the first crankshaft rotation is not larger than that during the second crankshaft rotation (i.e., is equal to or smaller than that during the second crankshaft rotation), the program proceeds to S20, in which it is discriminated that the stroke next to the first crankshaft (rotation between the first and second crank pulses) is the intake stroke (intake and compression strokes).

On the contrary, when the result in S18 is affirmative and it is determined that the average value during the first crankshaft rotation is larger than that during the second crankshaft rotation, the program proceeds to S22, in which it is discriminated that the stroke next to the first crankshaft rotation is the expansion stroke (expansion and exhaust strokes).

Explaining this, in the engine 10, since the intake valve 44 is opened in the intake stroke and the air in the air intake pipe 20 is sucked in the cylinder 12 (combustion chamber 16) and the pressure in the air intake pipe 20 drops and the air expands adiabatically, the intake air temperature drops accordingly. The present invention is made with focus on it.

As stated above, the embodiment is configured to have an apparatus and a method for discriminating a piston stroke of a general-purpose internal combustion engine (10) connectable to an operating machine (load 60) to be used as a prime mover of the machine, the engine having a four-stroke operating cycle comprising intake, compression, expansion and exhaust and including a piston (14) moveably accommodated in a cylinder (12) to be connected to a crankshaft (50), comprising: a crank angle sensor (pulsar coil) 54 that produces an output in response to rotation of the crankshaft at a predetermined crank angular position in synchronism with movement of the piston in the cylinder; an intake air temperature sensor (70) that produces an output indicative of a temperature of intake air sucked in to the engine; an engine operation condition determiner (ECU 80, S10 to S12) that determines whether operation of the engine is under a stable condition; and a stroke discriminator (ECU 80, S14 to S22) that discriminates based on the intake air temperature detected by the intake air temperature sensor whether a stroke next to the predetermined crank angular position at which the crank angle sensor produces the output is the intake stroke or the expansion stroke, when the operation of the engine is determined to be under the stable condition.

Specifically, the embodiment is configured to discriminate the piston stroke with focus on the fact that in the engine 10, since the intake valve 44 is opened in the intake stroke and since the air in the air intake pipe 20 is sucked in the cylinder 12 (combustion chamber 16) and the pressure in the air intake pipe 20 drops and the air expands adiabatically, the intake air temperature drops accordingly.

With this, it becomes possible to discriminate the four-stroke operating cycle (piston stroke) of the general-purpose engine without using an expensive pressure sensor. In addition, since it becomes possible to control the fuel injection and the like properly based on the detected operating cycle of the engine 10, whereby enabling to improve fuel consumption, performance and emission of the engine 10.

In the apparatus and method, the stroke discriminator compares the intake air temperature detected during a first crankshaft rotation between a first on of the output (first crank pulse) and a second one of the output (second crank pulse) of the crank angle sensor with the intake air temperature detected during a second crankshaft rotation between the second output and a third one of the output (third crank pulse) of the crank angle sensor, and when the intake air temperature during the first crankshaft rotation is not larger than the that during the second crankshaft rotation, discriminates that the stroke next to the first crankshaft rotation is the intake stroke (ECU 80, S14 to S22).

More specifically, in the apparatus and method, the stroke discriminator compares an average value of the intake air temperature detected during the first crankshaft rotation with an average value of the intake air temperature detected during the second crankshaft rotation, and when the average value of the intake air temperature during the first crankshaft rotation is not larger than the that during the second crankshaft rotation, discriminates that the stroke next to the first crankshaft rotation is the intake stroke (ECU 80, S14 to S22).

With this, it becomes possible to discriminate the four-stroke operating cycle (piston stroke) of the general-purpose engine accurately without using an expensive pressure sensor.

The apparatus further includes: an actuator (electric motor) 64 that moves a throttle valve (22) installed in an air intake pipe (20) to establish a desired engine speed set by an operator (through manipulation of an accelerator lever 62). With this, it becomes possible to discriminate the four-stroke operating cycle (piston stroke) of the general-purpose engine of this kind.

It should be noted in the above that, although the average value of the detected intake air temperature is used in the processing of the FIG. 3 flowchart, it is alternatively possible to use the detected intake air temperature itself that drops at that crank angles as shown in FIG. 2.

It should also be noted that, although the simple average value of the detected intake air temperature is used in the processing, it is alternatively possible to use other average value such as a weighted average value.

It should further be note that, although the embodiment is indicated with specific values in the foregoing, they are only examples and not limited thereto.

It should further be noted that, although the pulsar coil (crank angle sensor) 54 is adapted to produce the outputs at the predetermined crank angular position near the end of the exhaust stroke or the compression stroke, it can be modified to produce the at any crank angular position if the stroke next to thereto can be discriminated as the intake stroke.

It should further be noted that, although the engine 10 is configured to have one cylinder, it can be configured to have cylinders.

Japanese Patent Application No. 2010-201468, filed on Sep. 8, 2010, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for discriminating a piston stroke of a general-purpose internal combustion engine connectable to an operating machine to be used as a prime mover of the machine, the engine having a four-stroke operating cycle comprising intake, compression, expansion and exhaust and including a piston moveably accommodated in a cylinder to be connected to a crankshaft, comprising:
   a crank angle sensor that produces an output in response to rotation of the crankshaft at a predetermined crank angular position in synchronism with movement of the piston in the cylinder;
   an intake air temperature sensor that produces an output indicative of a temperature of intake air sucked in to the engine;
   an engine operation condition determiner that determines whether operation of the engine is under a stable condition; and
   a stroke discriminator that discriminates based on the intake air temperature detected by the intake air temperature sensor whether a stroke next to the predetermined crank angular position at which the crank angle sensor produces the output is the intake stroke or the expansion stroke, when the operation of the engine is determined to be under the stable condition.

2. The apparatus according to claim 1, wherein the stroke discriminator compares the intake air temperature detected during a first crankshaft rotation between a first on of the output and a second one of the output of the crank angle sensor with the intake air temperature detected during a second crankshaft rotation between the second output and a third one of the output of the crank angle sensor, and when the intake air temperature during the first crankshaft rotation is not larger than the that during the second crankshaft rotation, discriminates that the stroke next to the first crankshaft rotation is the intake stroke.

3. The apparatus according to claim 2, wherein the stroke discriminator compares an average value of the intake air temperature detected during the first crankshaft rotation with an average value of the intake air temperature detected during the second crankshaft rotation, and when the average value of the intake air temperature during the first crankshaft rotation is not larger than the that during the second crankshaft rotation, discriminates that the stroke next to the first crankshaft rotation is the intake stroke.

4. The apparatus according to claim 1, further including:
   an actuator that moves a throttle valve installed in an air intake pipe to establish a desired engine speed set by an operator.

5. A method for discriminating a piston stroke of a general-purpose internal combustion engine connectable to an operating machine to be used as a prime mover of the machine, the engine having a four-stroke operating cycle comprising intake, compression, expansion and exhaust and including a piston moveably accommodated in a cylinder to be connected to a crankshaft, comprising the steps of:
   producing an output in response to rotation of the crankshaft at a predetermined crank angular position in synchronism with movement of the piston in the cylinder;
   producing an output indicative of a temperature of intake air sucked in to the engine;

determining whether operation of the engine is under a stable condition; and discriminating based on the detected intake air temperature whether a stroke next to the predetermined crank angular position at which the output is produced is the intake stroke or the expansion stroke, when the operation of the engine is determined to be under the stable condition.

6. The method according to claim 5, wherein the step of stroke discriminating compares the intake air temperature detected during a first crankshaft rotation between a first on of the output and a second one of the output of the crank angle sensor with the intake air temperature detected during a second crankshaft rotation between the second output and a third one of the output of the crank angle sensor, and when the intake air temperature during the first crankshaft rotation is not larger than the that during the second crankshaft rotation, discriminates that the stroke next to the first crankshaft rotation is the intake stroke.

7. The method according to claim 6, wherein the step of stroke discriminating compares an average value of the intake air temperature detected during the first crankshaft rotation with an average value of the intake air temperature detected during the second crankshaft rotation, and when the average value of the intake air temperature during the first crankshaft rotation is not larger than the that during the second crankshaft rotation, discriminates that the stroke next to the first crankshaft rotation is the intake stroke.

\* \* \* \* \*

UNITED STATES PATENT AND TRADEMARK OFFICE
CERTIFICATE OF CORRECTION

PATENT NO. : 8,596,112 B2
APPLICATION NO. : 13/218838
DATED : December 3, 2013
INVENTOR(S) : Takashi Hashizume et al.

It is certified that error appears in the above-identified patent and that said Letters Patent is hereby corrected as shown below:

In the claims:

Column 8, line 34
--between a first on of the-- should read as --between a first one of the--

Column 9, line 10
--between a first on of the-- should read as --between a first one of the--

Signed and Sealed this
Fifteenth Day of April, 2014

Michelle K. Lee
*Deputy Director of the United States Patent and Trademark Office*